(12) United States Patent
Juneau

(10) Patent No.: US 8,080,892 B2
(45) Date of Patent: Dec. 20, 2011

(54) COMBINED WATER TANK AND GENERATOR

(76) Inventor: Todd L. Juneau, Alexandria, VA (US)

( * ) Notice: Subject to any disclaimer, the term of this patent is extended or adjusted under 35 U.S.C. 154(b) by 0 days.

(21) Appl. No.: 12/126,454

(22) Filed: May 23, 2008

(65) Prior Publication Data
US 2009/0289458 A1    Nov. 26, 2009

(51) Int. Cl.
F03B 13/00 (2006.01)
F03B 13/10 (2006.01)

(52) U.S. Cl. ............................................ 290/53; 290/54
(58) Field of Classification Search .................... 290/54, 290/53, 43, 42, 1 R; 416/7; 60/504, 495, 60/398, 698; 417/330, 331; 415/5
See application file for complete search history.

(56) References Cited

U.S. PATENT DOCUMENTS

| 218,858 | A | * | 8/1879 | Carleton | 415/5 |
| 1,058,776 | A | * | 4/1913 | Mickel | 415/5 |
| 1,510,740 | A | * | 10/1924 | Damon | 416/7 |
| 4,102,291 | A | * | 7/1978 | Sebald | 114/244 |
| 4,205,943 | A |  | 6/1980 | Vauthier |  |
| 4,239,976 | A |  | 12/1980 | Collard |  |
| 4,284,899 | A |  | 8/1981 | Bendiks |  |
| 4,456,119 | A | * | 6/1984 | in't Hout et al. | 198/535 |
| 4,698,516 | A | * | 10/1987 | Thompson | 290/54 |
| 5,905,312 | A |  | 5/1999 | Liou |  |
| 6,445,078 | B1 |  | 9/2002 | Cieslak, Jr. |  |
| 6,981,376 | B2 |  | 1/2006 | Dutta |  |
| 7,003,955 | B2 |  | 2/2006 | Davis |  |
| 2003/0214135 | A1 | * | 11/2003 | Peloquin | 290/54 |
| 2006/0017292 | A1 | * | 1/2006 | Matsubara | 290/43 |
| 2006/0290139 | A1 | * | 12/2006 | Takeuchi | 290/54 |
| 2007/0080540 | A1 | * | 4/2007 | Tung | 290/43 |
| 2007/0152450 | A1 | * | 7/2007 | Chiu | 290/54 |
| 2007/0248339 | A1 | * | 10/2007 | Akiyama | 392/441 |
| 2008/0238104 | A1 | * | 10/2008 | Dale | 290/54 |
| 2009/0102193 | A1 | * | 4/2009 | Murphy | 290/43 |

FOREIGN PATENT DOCUMENTS

| DE | 4325136 A1 | * | 1/1994 |
| JP | 10008508 A | * | 1/1998 |
| JP | 2007138912 A | * | 6/2007 |

* cited by examiner

Primary Examiner — Julio Gonzalez
(74) Attorney, Agent, or Firm — Todd L. Juneau; Joseph M. J. Hanrahan

(57) ABSTRACT

A combined water tank and generator is provided. By capturing rainwater into a container at a higher point, using the weight of the container to drive an electrical generator, and releasing the stored water once it has reached the ground, a system is provided that provides electricity and provides a source of water for later use.

10 Claims, 1 Drawing Sheet

COMBINED WATER TANK AND GENERATOR

CROSS REFERENCE TO RELATED APPLICATIONS

Not applicable.

STATEMENT REGARDING FEDERALLY SPONSORED RESEARCH

No government funds were used in researching or developing this invention.

BACKGROUND

1. Field of the Invention

The invention relates to the on-site generation and storage of electricity using a rain water collection tank as a gravity-driven force to generate electrical energy.

2. Background of the Invention

U.S. Pat. No. 6,445,078 to Cieslak Jr. granted 3 Sep. 2002 discloses a system for gravity generation of electricity which includes upper and lower water reservoirs with a conduit between the reservoirs and a pump to continuously pump water from the lower reservoir to the upper reservoir.

U.S. Published Application 2007/0248339 to Akiyama, filed 20 Apr. 2006, discloses a system for generating electricity for a structure, such as a home or building, receiving a water supply under pressure, comprising a plurality of oscillating tanks adapted to move from an upper position to a lower position by gravity, means to fill a tank with water from the water supply when the tank reaches its upper position, means to empty the water in the tank when the tank reaches its lower position by gravity, said water being passed back into the structure water supply, a generator having a shaft, means to turn the shaft by the oscillating movement of the tanks.

SUMMARY

A combined water tank and generator is provided. By capturing rainwater into a container at a higher point, using the weight of the container to drive an electrical generator, and releasing the stored water once it has reached the ground, a system is provided that provides electricity and provides a source of water for later use.

The rainwater is collected into a holding tank by diverting a common gutter system. The holding tank is connected to generator system. The holding tank starts empty at a higher position, having gravitational potential energy. Once the holding tank has reached the desired fill level, the holding tank is lowered. The lowering process drives the generator system to create electricity. The electricity is then stored, i.e. in batteries. Once at a lower, or ground, level, the holding tank may be emptied, and the holding tank raised to repeat the process.

In a preferred embodiment, there is provided a combined water storage and generator system for generating electricity from a rain water collection tank, which comprises: a housing, water holding tank, and generator system, wherein the housing comprises a structure for supporting and guiding the water holding tank and a lowering mechanism, and wherein the generator system comprises a generator and a gear system that is operatively connected to lowering mechanism, wherein when the tank is lowered the gear system drives the generator to generate electricity.

In other preferred embodiments, there is provided wherein the electricity is transmitted to an electricity storage device, and wherein the electricity storage device is a battery or a supercapacitor.

In a preferred embodiment, there is provided wherein the generator is a marine generator for trickle feeding a battery, or wherein the electricity is sold to an electricity supplier.

In another preferred embodiment, there is provided a method for generating electricity from a rain water collection tank using a combined water storage and generator system, which comprises: providing the combined water storage and generator system described herein; and producing electricity by filling the rain water collection tank and driving the generator system by lowering the rain water collection tank.

In preferred embodiments, the method includes the step of transmitting the electricity to an electricity storage device, or further comprises the step of storing electricity in an electricity storage device selected from a battery or a supercapacitor, or further comprises the step of selling the electricity to an electricity supplier.

DETAILED DESCRIPTION OF THE INVENTION

Figure 1:
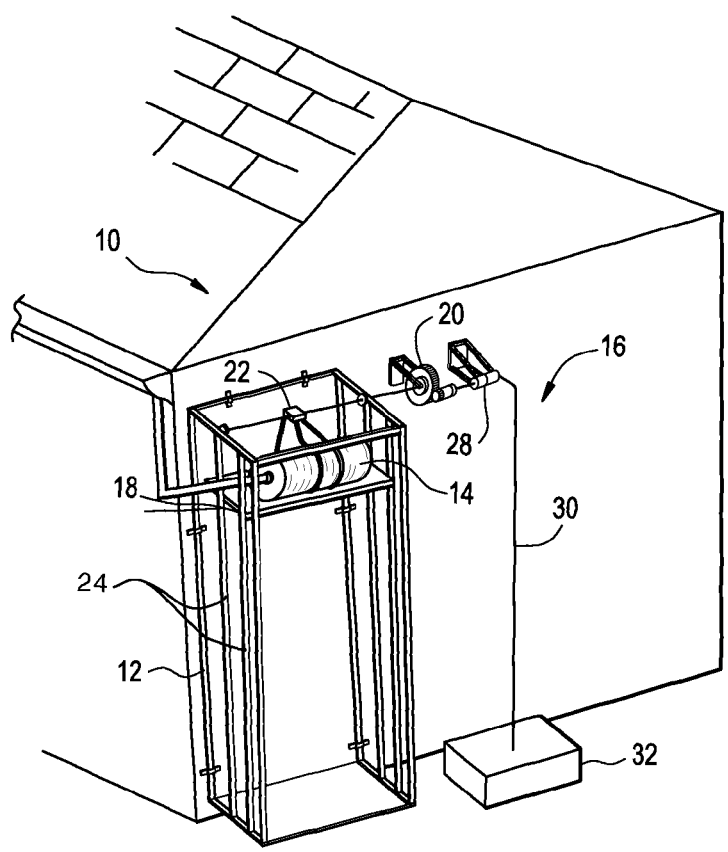
FIG. 1 is a drawing of one embodiment of the invention located next to a building.

Referring now to FIG. 1, a combined water tank and generator is shown. By capturing rainwater into the tank or a container at a higher point, the weight of the container is used to drive an electrical generator. Once the tank has been lowered, the rainwater stored therein may be released for watering plants or gray water uses, or drained. The rainwater may also be stored until either the water is needed or additional electricity needs to be generated.

The rainwater is collected into the holding tank by diverting a common gutter system. The holding tank is connected to generator system. The holding tank starts empty at a higher position, having gravitational potential energy. Once the holding tank has reached the desired fill level, the holding tank is lowered. The lowering process drives the generator system to create electricity. The electricity is then stored, i.e. in batteries. Once at a lower, or ground, level, the holding tank may be emptied, and the holding tank raised to repeat the process.

The rainwater may be collected from home or business gutter systems. The electricity may be used immediately or stored in any type of battery.

The holding tank may be of varying sizes, e.g. from 50 gal. barrels, to 500 gal. or 100 gal. containers. The generator system may use a pulley and gear system, or a hydraulic and gear system. For converting mechanical into electrical energy, a generator is used. The system may be connected to an inverter and can be configured to make DC and/or AC electricity. The entire unit may be enclosed in a frame, and may be attached to the building structure to secure it.

Referring to FIG. 1, water generator 10 comprises housing 12, tank 14, and generator system 16. Housing 12 may comprise in preferred embodiments a steel structure such as a platform 18 and guide tracks 24 for supporting and guiding the holding tank 14. The housing 12 may be made of steel, and may or may not enclose all or part of the generator system 16. Tank 14 is comprised commercially available liquid storage tanks or containers. The holding tank 14 may be plastic or steel, and can range from 50 gal. up to 1000 gal. in size. The generator system 16 may comprise a gear system 20 that is operatively connected to tank 14. In a preferred embodiment, the lowering device 22, which connects the gear system 20 to tank 14, may be a pulley connection or a hydraulic connection. The generator system 16 comprises a generator 28 in operative association with the lowering device 22. The lowering device 22 may further comprise a stop lock. The generator 28 is connected to an electrical line 30 for transmitting the generated electricity to an electricity storage device 32, or for re-selling electricity back to the grid. In a preferred embodiment, the electricity storage device 32 may comprise battery, supercapacitor, or other equivalent device.

In construction, the housing functions to support the tank or container and provide a mechanism for lowering the tank, e.g. to ground level. Accordingly, without being limited to any particular design, the housing may be constructed of wood, welded steel frame, or concrete, and is able to safely support a full tank being held at a desired height. Since water weighs about 1 kg per liter, a 500 liter tank would weigh 500 kg, and the housing would necessarily be constructed to functionally accommodate such forces. The housing also provides an integral lowering mechanism such as a platform that holds the tank and is connected to a pulley system or a hydraulic system. This mechanism also provides for raising the tank to the ready position, the higher initial position, to be re-filled, and can be raised using a hand-operated winch or can be automated using a motor. It is also contemplated that platform guide tracks may be built into the housing to ensure that the tank is lowered evenly, in a controlled fashion. Another feature may be the addition of a stop lock. The stop lock may be an aspect of the lowering device, a pin that fits into a series of holes in the guide track and engages the platform, or a ratchet and pawl device for a winch.

The tank, or container, for collecting the rainwater, may be any type of commercially available storage tank. Examples include draining tanks having a cradle, cistern tanks, plastic or steel drums, poly tanks in all shapes and sizes, steel tanks, and so forth. Both open and closed tanks are contemplated. The tank is filled by diverting water from a gutter system. The diverting mechanism may be a simple gutter downspout in the case of an open container, or it may be hose or other type of conduit that can carry water from a gutter system to the tank. If hose it used, it is contemplated that appropriate connectors are part of the tank filling system. It is also contemplated that a closed tank can be fitted with a catch and funnel system. Finally, the tank is fitted with a drainage plug, valve, or spigot to release the water from the tank once the tank has reached the desired lower level, e.g. the ground. This water can then be used in gray water systems, for watering plants, or simply drained away.

The size of the tank, or the number of tanks being used if more than one is connected to the generator system, depends on the amount of rainwater that is desired to be collected. For every inch of rainfall on a 1000 square foot area, 600 gallons will be collected.

TABLE 1

Energy Generation

The formula for electricity generation for a Commercial Dam (USGS)
Power (in kW) = Height (ft) × Flow (cu. ft. per second) × Efficiency/11.8

Example 1

One inch of rain collected from a 1000 sq. ft. rooftop (600 gal.) collected into two 300 gal. water tanks cooperatively connected to the generator would yield about 80 cubic feet of water (1 U.S. gal=0.1337 cu.ft.). Providing a "falling height" of 10 ft. in 1 second and an efficiency of 0.8 would yield about 54.4 kW. according to the following equation:

$$H(10 \text{ ft}) \times F(80 \text{ cu.ft. in 1 sec}) \times E(0.8)/11.8 = 54.4 \text{ kilowatts}$$

Thus, one inch of rain may generate 54.4 kilowatts of electricity.

The generator system functions to convert the mechanical energy of the tank being lowered into electrical energy. Accordingly, a gear system, generator shaft, flywheel, and other components are contemplated as within the scope of the invention. In a preferred embodiment, the generator may be the kind of water or wind powered generator that is used to trickle charge batteries. In another preferred embodiment, the generator may be an automotive alternator if AC current is desired, and which can be fitted with a rectifier if DC current is desired.

In operation, rainwater falling during a rain storm is diverted from a common gutter system into the holding tank. Once the tank reaches a desired fill level, the weight of the water will also direct a substantial downward force. Once the tank is released, it can slowly, or not so slowly, be guided toward its lower, or ground, level. Since the tank is connected to the gear system, which is part of the generator system, the downward movement of the tank is used to turn gears at sufficient rates of speed so as to generate electricity using the attached electrical generator. For a prototype, a common alternator from a car from be attached and be used to generate electricity. However, much more efficient generators are commercially available, such as those used for wind turbines, those used for marine uses, including water turbines, and those using magnetic systems.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A combined water storage and generator system for generating electricity from a rain water collection tank, which comprises: a housing, a water holding tank operatively connected to a rainwater gutter system, and generator system, wherein the housing comprises a structure with integral guide tracks bearing a platform for supporting and guiding the water holding tank and a lowering mechanism, wherein said lowering mechanism comprises a stop lock, wherein said rain water gutter system is adapted to collect rainwater from a rooftop of a home or business, wherein the generator system comprises a generator and a gear system that is operatively connected to said lowering mechanism, wherein when the tank is lowered the gear system drives the generator to generate electricity, and wherein the lowering mechanism is not engaged until a predetermined amount of rainwater is collected in the water holding tank.

2. The system of claim 1, further comprising wherein the electricity is transmitted to an electricity storage device.

3. The system of claim 2, further comprising wherein electricity storage device is a battery or a supercapacitor.

4. The system of claim 2, wherein the generator is a marine generator for trickle feeding a battery.

5. The system of claim 1, further comprising wherein the electricity is sold to an electricity supplier.

6. A method in a combined water storage and generator system for generating electricity from a rain water collection tank, which comprises: providing the combined water storage and generator system of claim 1; and producing electricity by filling the rain water collection tank and driving the generator system by lowering the rain water collection tank.

7. The method of claim 6, further comprising the step of transmitting the electricity to an electricity storage device.

8. The method of claim 6, further comprising the step of storing electricity in an electricity storage device selected from a battery or a supercapacitor.

9. The method of claim 6, further comprising wherein the generator is a marine generator for trickle feeding a battery.

10. The method of claim 6, further comprising the step of selling the electricity to an electricity supplier.

* * * * *